United States Patent
Lee et al.

(10) Patent No.: US 12,409,854 B2
(45) Date of Patent: Sep. 9, 2025

(54) SYSTEM ON CHIP, AUTONOMOUS DRIVING SYSTEM INCLUDING THE SAME, AND OPERATING METHOD OF THE AUTONOMOUS DRIVING SYSTEM

(71) Applicant: SAMSUNG ELECTRONICS CO., LTD., Suwon-si (KR)

(72) Inventors: Seunghan Lee, Suwon-si (KR); Seungcheol Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 92 days.

(21) Appl. No.: 18/370,628

(22) Filed: Sep. 20, 2023

(65) Prior Publication Data

US 2024/0278801 A1    Aug. 22, 2024

(30) Foreign Application Priority Data

Feb. 17, 2023 (KR) .................. 10-2023-0021578

(51) Int. Cl.
*B60W 60/00* (2020.01)
*B60W 30/06* (2006.01)
*B60W 50/00* (2006.01)

(52) U.S. Cl.
CPC .......... *B60W 60/001* (2020.02); *B60W 30/06* (2013.01); *B60W 2050/0018* (2013.01); *B60W 2556/00* (2020.02)

(58) Field of Classification Search
CPC .. G05D 1/0088; G05D 1/0061; G05D 1/0077; G05D 1/81; G05D 1/87; B60W 50/0205; B60W 2050/0006; B60W 50/023; B60W 50/0225; B60W 50/082; B60W 30/06; B60W 50/029; B60W 60/001; B60W 2050/0018; B60W 2556/00; B60W 50/035; B60W 60/0015; B60W 30/181;
(Continued)

(56) References Cited

U.S. PATENT DOCUMENTS 11,022,979 B2    6/2021 Hashimoto et al.
11,214,273 B2    1/2022 Yousuf et al.
(Continued)

FOREIGN PATENT DOCUMENTS

JP    2022139311 A    9/2022

*Primary Examiner* — Abby Y Lin
*Assistant Examiner* — Kayla R Doros
(74) *Attorney, Agent, or Firm* — Sughrue Mion, PLLC

(57) ABSTRACT

An autonomous driving system including: a first system on chip (SoC) configured to control an autonomous driving function of a vehicle and including a first safe parking module configured to control parking of the vehicle according to first failure information; and a second SoC configured to be driven at a higher operating performance than an operating performance of the first SoC, configured to control the autonomous driving function of the vehicle, and including a second safe parking module configured to control the parking according to second failure information provided, wherein the first SoC or the second SoC is configured to be selectively driven according to level information corresponding to an autonomous driving level, and, based on a failure occurring in the first SoC, the second safe parking module is further configured to control the parking or stopping of the vehicle in response to receiving the second failure information.

20 Claims, 12 Drawing Sheets

(58) Field of Classification Search
CPC ...... B60W 2050/0005; B60W 2520/04; B62D 15/0285; G06V 20/56; G06V 10/955; G06F 15/7807
See application file for complete search history.

(56) References Cited

U.S. PATENT DOCUMENTS

| | | |
|---|---|---|
| 11,262,757 B2 | 3/2022 | Jang et al. |
| 11,345,359 B2 | 5/2022 | Zhu |
| 11,351,989 B2 | 6/2022 | Yoo et al. |
| 11,560,154 B1* | 1/2023 | Gate .................. G01C 21/3614 |
| 2018/0348754 A1* | 12/2018 | Samii ................... G05D 1/0077 |
| 2022/0032904 A1* | 2/2022 | Lee ................. B60W 60/00186 |
| 2022/0108045 A1 | 4/2022 | Alvarez et al. |
| 2022/0371607 A1* | 11/2022 | Uhlig .................. B60W 50/029 |

* cited by examiner

SYSTEM ON CHIP, AUTONOMOUS DRIVING SYSTEM INCLUDING THE SAME, AND OPERATING METHOD OF THE AUTONOMOUS DRIVING SYSTEM

CROSS-REFERENCE TO RELATED APPLICATION

This application is based on and claims priority under 35 U.S.C. § 119 to Korean Patent Application No. 10-2023-0021578, filed on Feb. 17, 2023, in the Korean Intellectual Property Office, the disclosure of which is incorporated by reference herein in its entirety.

BACKGROUND

Embodiments of the present disclosure relate to a system on chip (SoC) and an autonomous driving system including the same, and more particularly, to an autonomous driving system including a plurality of different types of SoCs and an operating method of the autonomous driving system.

The autonomous driving technology aims to control vehicle driving by recognizing objects and situations based on information from various types of sensors such as a camera sensor. An SoC (e.g., an advanced driver assistance system (ADAS) SoC) processing information from various types of sensors is used in an autonomous driving system. Also, a number of SoCs are used in an autonomous driving system to maximize safety performance due to characteristics of the autonomous driving system. For example, a method in which one or more SoCs are further provided in an autonomous driving system for redundancy in preparation for SoC failure has been proposed. However, using a large number of high performance SoCs in an autonomous driving system will increase the unit cost per system.

SUMMARY

Embodiments of the present disclosure relate to a system on chip (SoC) for a vehicle, the SoC being capable of reducing implementation cost while securing stability of autonomous driving of the vehicle, an autonomous driving system including the SoC, and an operating method of the autonomous driving system.

According to an embodiment of the present disclosure, an autonomous driving system is provided and includes: a first system on chip (SoC) configured to control an autonomous driving function of a vehicle and including a first safe parking module configured to control parking of the vehicle according to first failure information provided from an outside of the first SoC; a second SoC configured to be driven at a higher operating performance than an operating performance of the first SoC, configured to control the autonomous driving function of the vehicle, and including a second safe parking module configured to control the parking of the vehicle according to second failure information provided from an outside of the second SoC; and a storage including a storage space for the first SoC and the second SoC, wherein the first SoC or the second SoC is configured to be selectively driven according to level information corresponding to an autonomous driving level, and wherein, while the first SoC is selected to control the autonomous driving function, the second safe parking module is further configured to control the parking or stopping of the vehicle in response to receiving the second failure information from the first SoC.

According to an embodiment of the present disclosure, an operating method of an autonomous driving system configured to control an autonomous driving function of a vehicle that includes a plurality of sensors is provided. The operating method includes: receiving level information corresponding to an autonomous driving level; selectively driving a first system on chip (SoC) provided in the autonomous driving system based on the level information being less than a reference level; controlling autonomous driving of the vehicle based on control of the first SoC; and controlling parking or stopping of the vehicle, based on control of a second SoC provided in the autonomous driving system, based on a determination that a failure occurs in the first SoC while the first SoC is driven, wherein the second SoC has a higher operating performance than an operating performance of the first SoC.

According to an embodiment of the present disclosure, a system on chip (SoC) is provided and includes: at least one processor; and memory storing at least one computer program that, when executed by the at least one processor, is configured to: selectively drive an autonomous driving module, that controls an autonomous driving function of a vehicle, based on a comparison between level information and a predetermined reference level, wherein the level information is received by the SoC and corresponds to an autonomous driving level selected among a plurality of autonomous driving levels; and control parking or stopping of the vehicle by driving the autonomous driving module in response to first failure information indicating a first failure that occurs in an external SoC in a state in which the autonomous driving module is not driven.

BRIEF DESCRIPTION OF DRAWINGS

Embodiments will be more clearly understood from the following detailed description taken in conjunction with the accompanying drawings in which.

DETAILED DESCRIPTION

Hereinafter, non-limiting example embodiments of the present disclosure will be described in detail with reference to the accompanying drawings.

Figure 1:
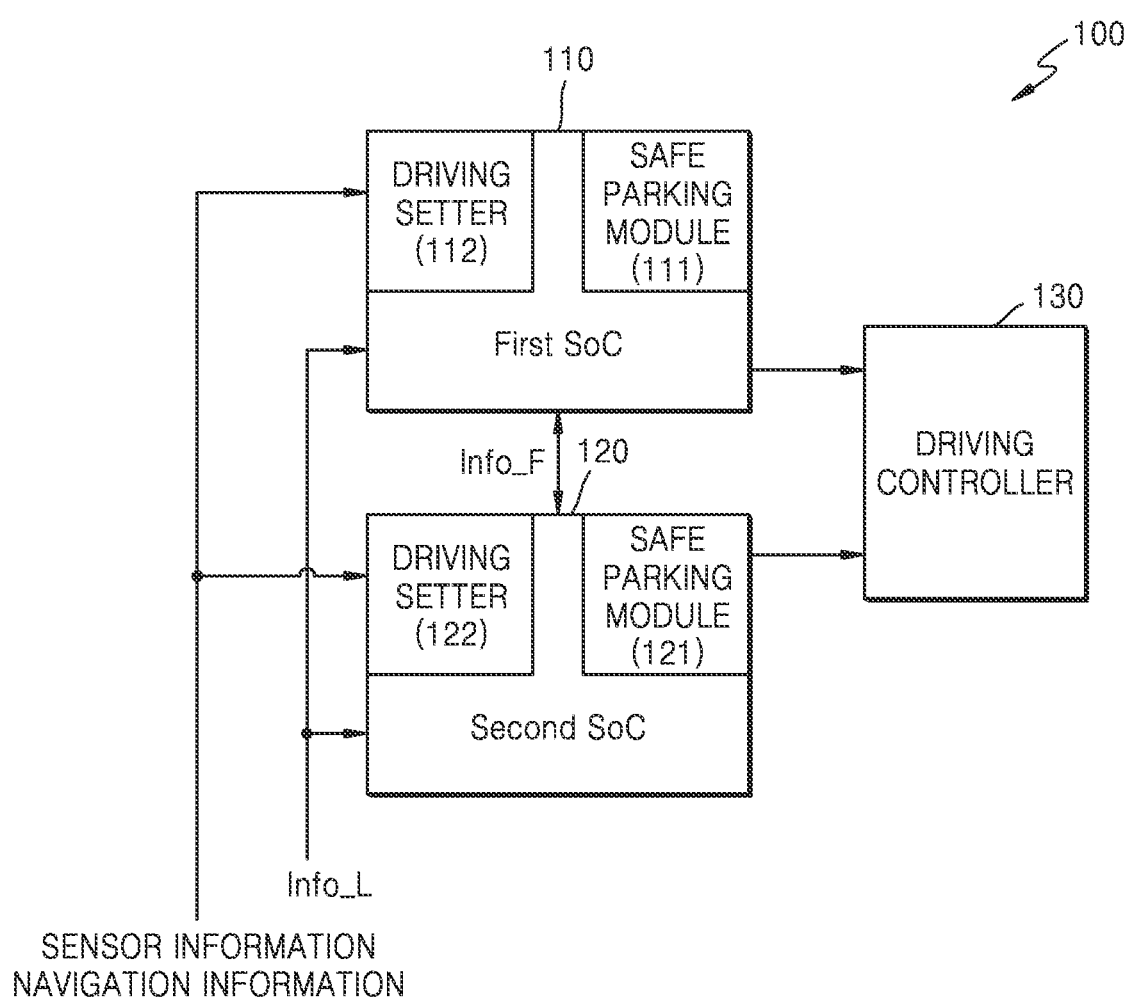
FIG. 1 is a block diagram illustrating a system on chip (SoC) and an autonomous driving system including the same according to an embodiment.

FIG. 1 is a block diagram illustrating a system on chip (SoC) and an autonomous driving system 100 including the same according to an embodiment.

Referring to FIG. 1, the autonomous driving system 100 may include a plurality of components mounted in a vehicle. For example, the autonomous driving system 100 may include a plurality of SoCs having different characteristics. For example, the autonomous driving system 100 may include a first SoC 110 and a second SoC 120. In addition, the autonomous driving system 100 may further include a driving controller 130. In addition, the first SoC 110 may include a first safe parking module 111 and a driving setter 112, and the second SoC 120 may include a second safe parking module 121 and a driving setter 122. The first SoC 110 and the second SoC 120 may have various types of characteristics, and may have different operating performances, such as different driving clock frequencies or different numbers of cores. In embodiments, the first SoC 110 is defined as having lower performance than the second SoC 120.

In an embodiment, each of the first SoC 110 and the second SoC 120 may include a system bus to which a protocol having a predetermined standard bus specification is applied, and various intellectual properties (IP) connected to the system bus. As a standard specification of the system bus, the advanced microcontroller bus architecture (AMBA) protocol of Advanced RISC Machine (ARM) may be applied. Bus types of the AMBA protocol may include an advanced high performance bus (AHB), an advanced peripheral bus (APB), an advanced extensible interface (AXI), AXI4, and AXI coherency extensions (ACE). In addition, other types of protocols such as SONICs Inc.'s uNetwork, IBM's CoreConnect, and OCP-IP's Open Core Protocol may be applied. In addition, as the first SoC 110 and the second SoC 120 are adopted in the autonomous driving system 100, each of the first SoC 110 and the second SoC 120 may correspond to the ADAS SoC.

Each of the first SoC 110 and the second SoC 120 may receive sensor information and navigation information and may perform various control operations for autonomous driving of the vehicle. For example, the sensor information may include information from various types of sensors mounted in the vehicle. The sensor information may include image information provided by an image sensor and distance information provided by various types of sensors such as a light detection and ranging (LIDAR) sensor, a radar sensor, a time of flight (ToF) sensor, an ultrasonic sensor, and an infrared sensor. In addition, the sensor information may further include information provided by at least one of a magnetic sensor, a position sensor (e.g., a global positioning system (GPS)), an acceleration sensor, an air pressure sensor, a temperature/humidity sensor, a proximity sensor, and a gyroscope sensor. In addition, the navigation information may include various types of information items such as position information of a driving vehicle and road information.

The driving setter 112 of the first SoC 110 may control driving of the first SoC 110 in relation to autonomous driving control. In an example embodiment, information representing an autonomous driving level (hereinafter, referred to as level information Info_L) selected by a driver in relation to an autonomous driving function may be provided to the first SoC 110 and the second SoC 120, and the driving setter 112 may activate driving of the first SoC 110 or an autonomous driving control function of the first SoC 110 when the level information Info_L is less than (or less than or equal to) a predetermined reference value.

The driving setter 122 of the second SoC 120 may activate driving of the second SoC 120 or an autonomous driving control function of the second SoC 120 when the level information Info_L is greater than or equal to (or greater than) a predetermined reference value. In the embodiment of FIG. 1, the autonomous driving system 100 is illustrated as including two SoCs. However, the autonomous driving system 100 may include three or more SoCs. In addition, one or some of the three or more SoCs may be selected and driven according to the autonomous driving level.

In the embodiment shown in FIG. 1, it is illustrated that the sensor information and the navigation information are provided to the first SoC 110 and the second SoC 120. However, the embodiments of the present disclosure are not limited thereto. As described above, one of the first SoC 110 and the second SoC 120 may be selectively activated according to the level information Info_L, and the sensor information and the navigation information may be provided to only one SoC performing the autonomous driving function.

The autonomous driving level may be classified into various levels. For example, in autonomous driving level classification defined by the society of automotive engineers (SAE), levels 0 to 5 are proposed, with level 0 being a non-automation state, level 1 being a driver assistance state, level 2 being a partial automation state, level 3 being a conditional automation state, level 4 being a high automation state, and level 5 being a full automation state. In addition, driving responsibilities, such as regarding accidents, may vary according to the autonomous driving level. For example, while the driver may be responsible for driving at the levels 0 to 2, the autonomous driving system 100 may be responsible for driving at the levels 3 to 5.

In the embodiment, selective driving of the SoC according to the level information Info_L may be variously set. For example, when autonomous driving is performed at a low level, by selectively driving the first SoC 110 having low performance, compared to a case in which a plurality of high performance SoCs are arranged, the implementation cost of the autonomous driving system 100 may be reduced and power consumption may be reduced. Meanwhile, when autonomous driving is performed at a high level, by selectively driving the second SoC 120 having high performance, high performance operation processing may be performed by using a plurality of sensor information items, and autonomous driving performance and safety may be secured.

In selectively driving one of the first SoC 110 and the second SoC 120 according to embodiments, the autonomous driving system 100 may be implemented so that the first SoC 110 is selectively driven when the levels 0 to 2 are selected by the driver based on the above-described driving responsibility and the second SoC 120 is selectively driven when the levels 3 to 5 are selected.

In the embodiment shown in FIG. 1, it is illustrated that one of the first SoC 110 and the second SoC 120 is selectively driven and driving information on autonomous driving is provided to the driving controller 130. However, embodiments of the present disclosure are not limited thereto. For example, a component capable of receiving and determining the level information Info_L may be further arranged in the autonomous driving system 100, and the autonomous driving system 100 may be implemented so that one of driving information items provided by the first SoC 110 and the second SoC 120, which corresponds to the level information Info_L, is provided to the driving controller 130. Alternatively, in the embodiment shown in FIG. 1, it is illustrated that the level information Info_L is provided to the first SoC 110 and the second SoC 120. However, embodiments of the present disclosure are not limited thereto. For example, a component controlling driving of the SoC according to the level information Info_L may be further arranged in the autonomous driving system 100, and the autonomous driving system 100 may be implemented so that the component activates driving of one of the first SoC 110 and the second SoC 120 in response to the level information Info_L.

For example, when the first SoC 110 is driven, the first SoC 110 may generate driving information by performing various operation processings based on the sensor information and/or the navigation information, and may generate driving information through a neural network operation or an artificial intelligence operation for various information items on autonomous driving. The driving information may be provided to the driving controller 130, and the driving controller 130 may output various vehicle control information items for controlling a steering system, a braking system, and a power system provided in the vehicle.

The autonomous driving system 100 according to the embodiment may provide a safe parking function by a SoC different from a subject currently controlling autonomous driving. For example, when abnormal information is generated due to malfunction of the second SoC 120 while the second SoC 120 performs a control operation for autonomous driving according to the autonomous driving level selected by the driver, the first safe parking module 111 of the first SoC 110 may perform a control operation for parking the vehicle in a safe place. In addition, the above-described control operation for safe parking may be performed in various abnormal situations such as a failure of error correction code (ECC) processing for various information items, and in the embodiments, as a phrase collectively referring to occurrence of the above-described abnormal situations, it will be described that a failure occurs in the SoC.

A safe parking operation may be performed through various operation flows, and when the vehicle is in a driving state, a series of operations may be performed so that the vehicle is parked or stopped in a safe position. Meanwhile, the second SoC 120 may include a second safe parking module 121, and when a failure occurs in the first SoC 110 while performing the control operation for autonomous driving, the second safe parking module 121 may perform the control operation for safe parking of the vehicle.

Each of the first SoC 110 and the second SoC 120 may output failure information Info_F. In an embodiment, the failure information Info_F may be transmitted and received between the first SoC 110 and the second SoC 120. Accordingly, when the second SoC 120 outputs the failure information Info_F to the first SoC 110 while the second SoC 120 is selectively driven, the first SoC 110 may enter a driving mode for safe parking of the vehicle, and a safe parking function for the vehicle may be controlled based on control of the first safe parking module 111 of the first SoC 10. In addition, in an embodiment, driving of the second SoC 120 may be deactivated after the second SoC 120 outputs the failure information Info_F.

In the embodiment shown in FIG. 1, it is illustrated that the failure information Info_F is directly transmitted and received between the first SoC 110 and the second SoC 120. However, embodiments of the present disclosure are not limited thereto. For example, a communication device controlling communications among the plurality of SoCs may be provided in the vehicle or the autonomous driving system 100, and the failure information Info_F may be transmitted and received between the first SoC 110 and the second SoC 120 through the communication device.

In general, an autonomous driving system may include a high performance SoC to process information from a large number of sensors, and additionally may include one or more high performance redundancy SoCs to secure stability of autonomous driving. In this case, cost of implementing an autonomous driving system remarkably increases. On the other hand, according to the embodiment, because two or more SoCs having different performances are provided in the autonomous driving system 100 and a low performance SoC may be selectively driven according to the autonomous driving level selected by the driver, the cost of implementing the autonomous driving system 100 may be reduced.

In addition, according to the embodiment, when each of the plurality of SoCs includes a safe parking module, and a failure occurs in the currently driven SoC, the failure information Info_F is transmitted and received through the communications among the plurality of SoCs and the autonomous driving for the safe parking may be performed based on control of an SoC in which a failure does not occur. Therefore, the stability of the autonomous driving may be secured in the autonomous driving system 100.

Figure 2:
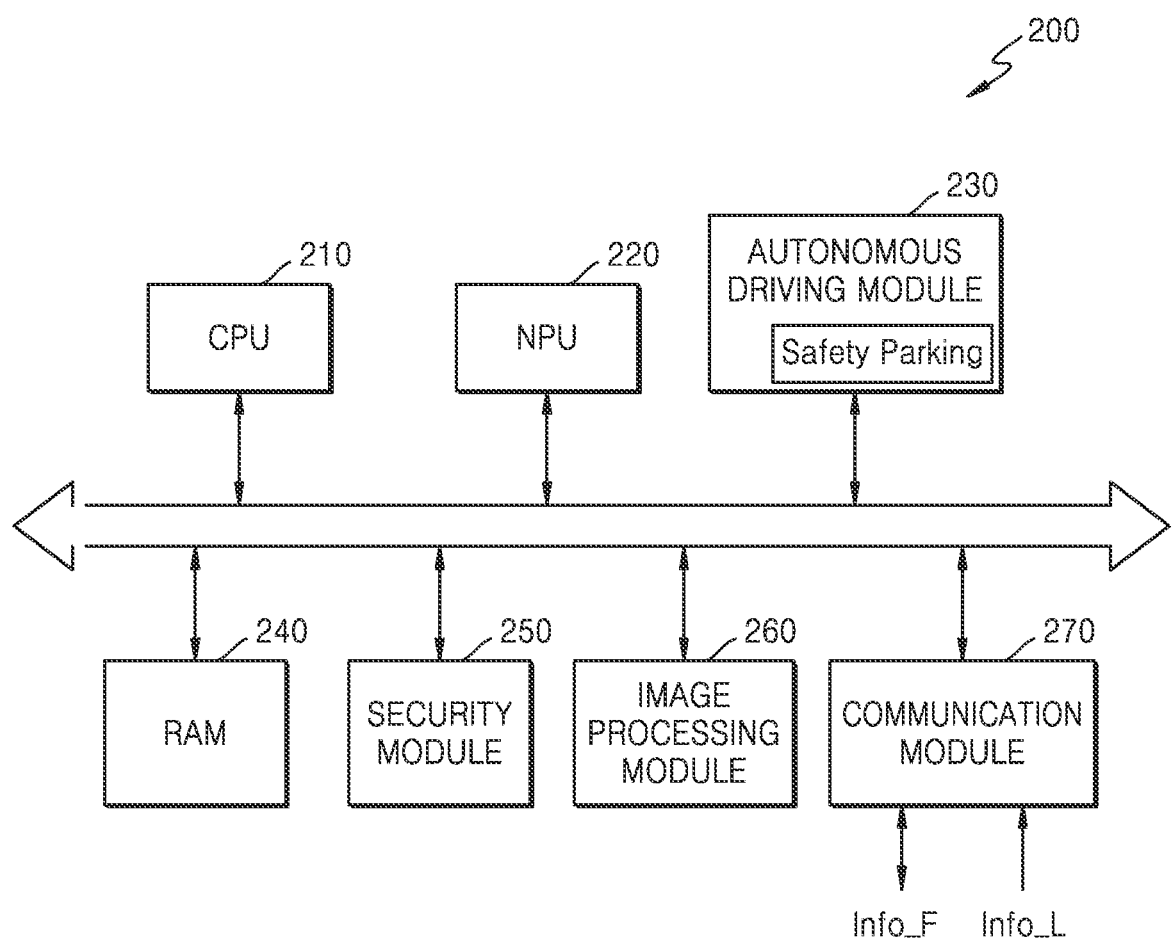
FIG. 2 is a block diagram illustrating a SoC according to an embodiment.

FIG. 2 is a block diagram illustrating a SoC 200 according to an embodiment. The SoC 200 of FIG. 2 may correspond to the first SoC 110 or the second SoC 120 in the above-described embodiment.

The SoC 200 may include one or more processors, and each processor may include a single core or multiple cores. For example, the SoC 200 may include a central processing unit (CPU) 210 and a neural processing unit (NPU) 220. In FIG. 2, it is illustrated that the CPU 210 and the NPU 220 are provided in the SoC 200. However, different types of various processors may be provided in the SoC 200. For example, a graphics processing unit (GPU) may be provided as a general processor, or an application-specific integrated circuit (ASIC), a tensor processing unit (TPU), and a neural engine may be provided as dedicated processors in relation to neural network operation.

In addition, according to the embodiments, the SoC 200 may further include an autonomous driving module 230, random access memory (RAM) 240, a security module 250, an image processing module 260, and a communication module 270. The RAM 240 may temporarily store programs, data, or instructions, and each of the CPU 210 and the NPU 220 may perform a unique function according to execution of the programs by executing the programs stored in the RAM 240.

On the other hand, with respect to the embodiment shown in FIG. 2, the autonomous driving module 230, the security module 250, and the image processing module 260 are described as separate components. However, each of the autonomous driving module 230, the security module 250, and the image processing module 260 may be implemented as same or different hardware, software, or a combination thereof. For example, a component implemented as software in the autonomous driving module 230, the security module 250, and the image processing module 260 may correspond to a set of the programs stored in the RAM 240. According to embodiments, descriptions in the present disclosure that each of the autonomous driving module 230, the security module 250, and the image processing module 260 performs a function related to sensor information processing and autonomous driving may represent that one or more processors execute the autonomous driving module 230, the security module 250, and the image processing module 260.

In performing the autonomous driving, various types of neural network operations such as convolutional neural networks (CNN), recurrent neural networks (RNN), deep belief networks, and restricted Boltzman machines may be performed by using information provided by various sensors. Various types of information items such as a voice recognition signal, an object recognition signal, an image recognition signal, and a biometric information recognition signal may be generated from neural network operation results. In addition, driving information items on the autonomous driving of the vehicle may be generated through various types of neural network operations based on the generated information items. For example, the steering system, the braking system, and the power system provided in the vehicle may be controlled based on recognition results of various voices/objects.

The communication module 270 may communicate with an external device, and may perform a communication by using, for example, a vehicle to vehicle (V2V) method, a vehicle to infra (V2I) method, a vehicle to pedestrian (V2P) method, or a vehicle to nomadic devices (V2N) method, or may perform a short-range or long-range communication such as 3G, long term evolution (LTE), Wi-Fi, Bluetooth, Bluetooth low energy (BLE), Zigbee, or near field communication (NFC). In addition, in the embodiment, the SoC 200 may receive the level information Info_L on the autonomous driving selected by the driver through the communication module 270. In addition, in the embodiment, when a failure is detected in a state in which the SoC 200 is driven, the failure information Info_F may be output to the outside through the communication module 270 and the failure information Info_F representing that a failure occurs in another SoC driven for the autonomous driving may be received.

When the failure information Info_F is received from the outside in a state in which the SoC 200 is not driven, the safe parking module in the SoC 200 may be executed in response to the receipt of the failure information Info_F. The autonomous driving for the safe parking of the vehicle may be controlled according to the execution of the safe parking module.

Also, the security module 250 may perform security processing on various sensor information items provided to the SoC 200. For example, in order to prevent risks caused by forged sensor information in the autonomous driving, security may be secured through encryption/decryption processing for sensor information, and the security module 250 may determine whether the sensor information is forged through the encryption/decryption processing for the received sensor information. In addition, the image processing module 260 may perform a processing operation on image information among sensor information items from the outside, and may provide, for example, information obtained by detecting/recognizing various objects included in an image. The autonomous driving module 230 may control an autonomous driving operation based on the information obtained by detecting/recognizing the objects from the image processing module 260.

Also, the autonomous driving system or the SoC may include a storage storing information non-volatilely, for example, read only memory (ROM), flash memory, phase-change RAM (PRAM), magnetic RAM (MRAM), resistive RAM (RRAM), or ferroelectric RAM (FRAM). In addition, various modules for performing the autonomous driving function according to the embodiments may be stored in the storage, and the various modules may be loaded in RAM in the SoC when the autonomous driving system is driven.

Figure 3:
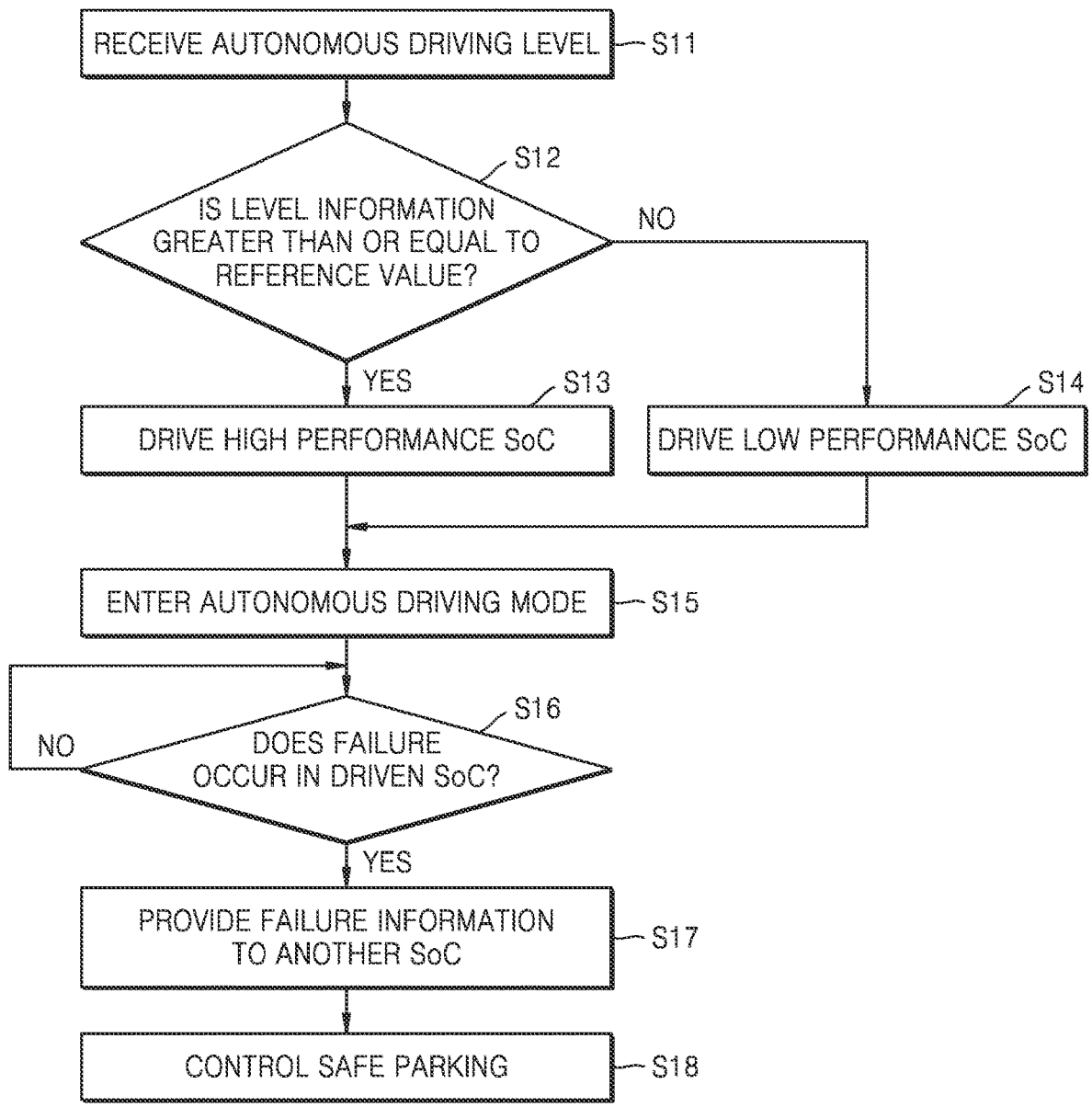
FIG. 3 is a flowchart illustrating an operating method of an autonomous driving system according to an embodiment.

FIG. 3 is a flowchart illustrating a method of operating an autonomous driving system according to an embodiment. With reference to FIG. 3, it is described that the autonomous driving system includes a low performance SoC and a high performance SoC.

Referring to FIG. 3, the vehicle may be provided with a configuration for selecting a level of autonomous driving, and at least one of the low performance SoC and the high performance SoC may receive the level information Info_L on autonomous driving according to a selection result in operation S11. In the embodiment, a plurality of SoCs may be provided in the autonomous driving system, the level information Info_L may be provided to the plurality of SoCs, or a control configuration receiving autonomous driving level information and controlling driving of the low performance SoC and the high performance SoC may be provided in the autonomous driving system.

The SoC may compare the level information with a predetermined reference value in operation S12. For example, the low performance SoC may perform an internal control operation so that the low performance SoC is selectively driven when the level information is equal to or less than (or less than) a predetermined reference value in operation S14. On the other hand, the high performance SoC may perform an internal control operation to be selectively driven when the level information is greater than or equal to (or greater than) a predetermined reference value in operation S13.

The autonomous driving system may enter an autonomous driving mode based on control of the low performance SoC or the high performance SoC in operation S15, and it may be periodically determined whether a failure occurs in the currently driven SoC in operation S16. It may be determined whether a failure occurs in the currently driven SoC based on various determination operations and various criteria such as a defect in a circuit configuration in the currently driven SoC, a processing error in encryption/decryption of received sensor information items, and an error in a processing operation for recognizing various objects such as voice, object, and biometric information from the sensor information items. When it is determined that a failure occurs in the currently driven SoC, the currently driven SoC may provide failure information to another SoC in operation S17. When it is determined that a failure occurs in the low performance SoC in relation to autonomous driving while the low performance SoC is driven, failure information may be provided to the high performance SoC.

The SoC receiving the failure information may drive the safe parking module in response to the failure information. The safe parking module may control a series of operations for parking the vehicle in a safe place in operation S18, and for example, the safe parking operation may be controlled based on a neural network operation result from various modules in the SoC.

Figure 4:
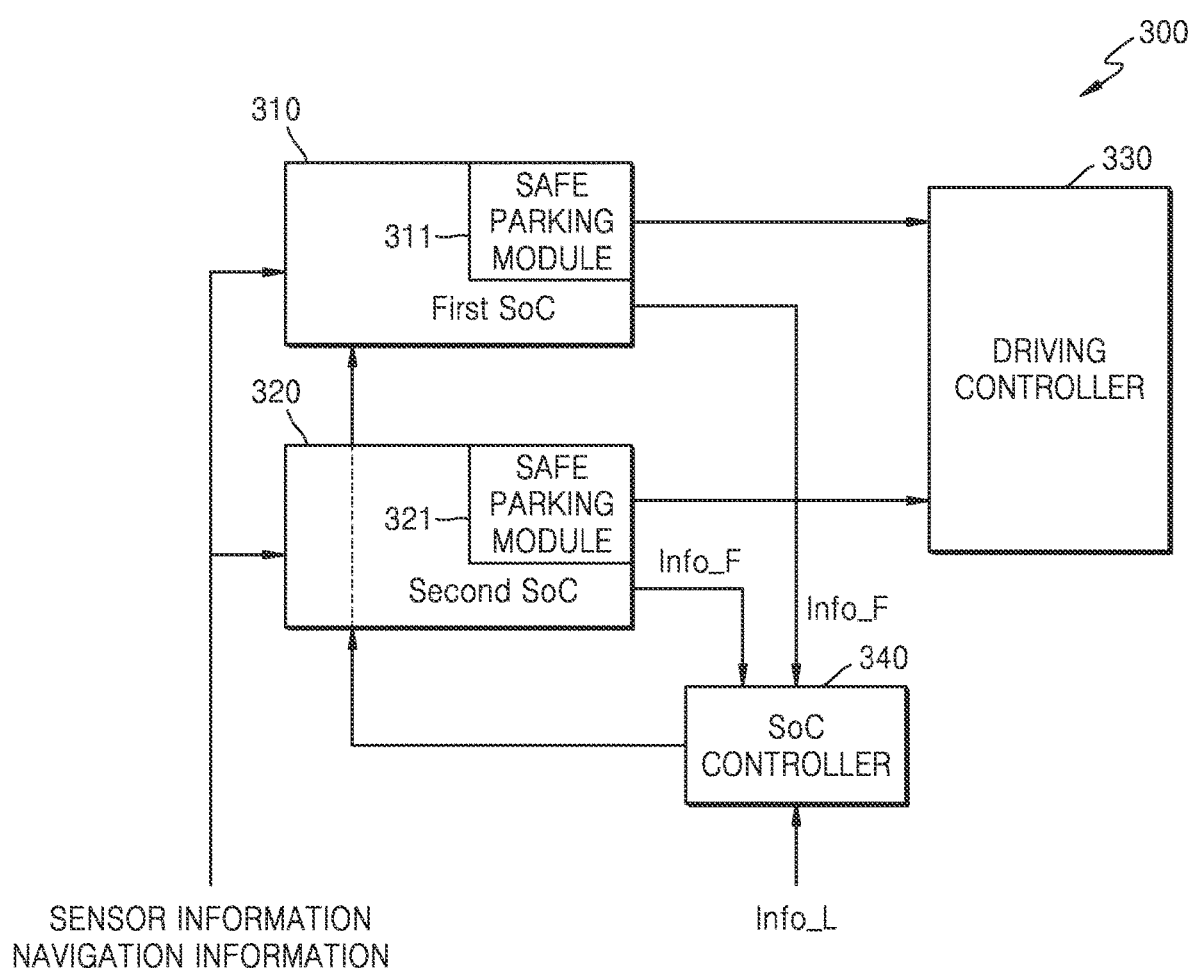
FIG. 4 is a block diagram illustrating a SoC and an autonomous driving system including the same according to another embodiment.

FIG. 4 is a block diagram illustrating a SoC and an autonomous driving system 300 including the same according to another embodiment.

Referring to FIG. 4, the autonomous driving system 300 may include a first SoC 310 and a second SoC 320, the first SoC 310 may include a first safe parking module 311, and the second SoC 320 may include a second safe parking module 321. Although not shown in FIG. 4, each of the first SoC 310 and the second SoC 320 may include an autonomous driving module. The first SoC 310 may operate with low performance, and the second SoC 320 may operate with high performance. According to the above-described embodiments, the level information Info_L may be selected by the driver to be provided to the autonomous driving system 300, and one of the first SoC 310 and the second SoC 320 may be selectively driven in relation to autonomous driving according to the level information Info_L. In addition, each of the first SoC 310 and the second SoC 320 may receive the sensor information and the navigation information and may perform various control operations for autonomous driving of the vehicle.

According to an embodiment, the autonomous driving system 300 may further include a driving controller 330 and an SoC controller 340. The driving controller 330 may perform autonomous driving of the vehicle based on driving information from the first SoC 310 or the second SoC 320.

The SoC controller 340 may control driving of the first SoC 310 and the second SoC 320 based on various information items, or may control driving of various modules in the first SoC 310 and the second SoC 320. In an embodiment, the level information Info_L may be provided to the SoC controller 340, and the SoC controller 340 may selectively drive one of the first SoC 310 and the second SoC 320 according to a result of comparing the level information Info_L with a predetermined reference value. According to the above-described embodiments, when the level information Info_L is less than a predetermined reference value, the SoC controller 340 may selectively drive the first SoC 310.

Also, when a failure occurs while the first SoC 310 or the second SoC 320 is driven in relation to autonomous driving, the failure information Info_F may be provided to the SoC controller 340. The SoC controller 340 may safely park the vehicle by changing a subject performing autonomous driving based on the failure information Info_F. When the failure information Info_F from the first SoC 310 is provided to the SoC controller 340, the SoC controller 340 may perform a series of operations for safe parking of the vehicle by driving the second SoC 320 or the second safe parking module 321.

In the above-described embodiments, an operation of deactivating driving of the SoC may be variously defined. For example, driving of the SoC may be deactivated so that power consumed by the SoC is not generated or minimized. Alternatively, when the SoC needs to perform mutual verification of information processing related to autonomous driving of another SoC, while the SoC does not generate driving information on autonomous driving, driving of at least one processor and verification module in the SoC may be selectively activated.

Figure 5:
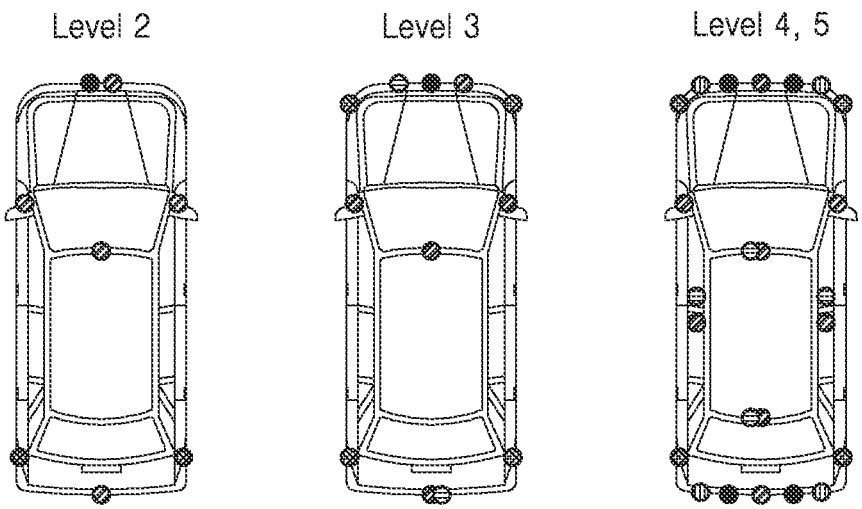
FIG. 5 is a conceptual diagram illustrating an example of processing sensor information according to an autonomous driving level.

FIG. 5 is a conceptual diagram illustrating an example of processing sensor information according to an autonomous driving level.

Referring to FIG. 5, LIDAR sensors and radar sensors may be classified into various types according to an effective measurement distance. For example, a vehicle may be provided with one or more long radar sensors and short radar sensors as radar sensors and one or more long LIDAR sensors and short LIDAR sensors as LIDAR sensors. In addition, the vehicle may be provided with a plurality of image sensors, and various types of sensors such as the acceleration sensor and the proximity sensor.

According to the autonomous driving level selected by the driver, only some of a plurality of sensors provided in the vehicle may be selectively activated, and as the autonomous driving level increases, more sensors may be activated. In addition, meanwhile the low performance SoC provided in the autonomous driving system may have ability to process information on sensors activated at a second level, the high performance SoC may have ability to process information on sensors activated at a third level or higher. In the embodiments, selective driving of the low performance SoC or the high performance SoC may be based on autonomous driving level information selected by the driver, or the number and type of sensors activated at each driving level. In addition, activation of the plurality of sensors in the vehicle may be controlled by the low performance SoC and the high performance SoC.

Figure 6:
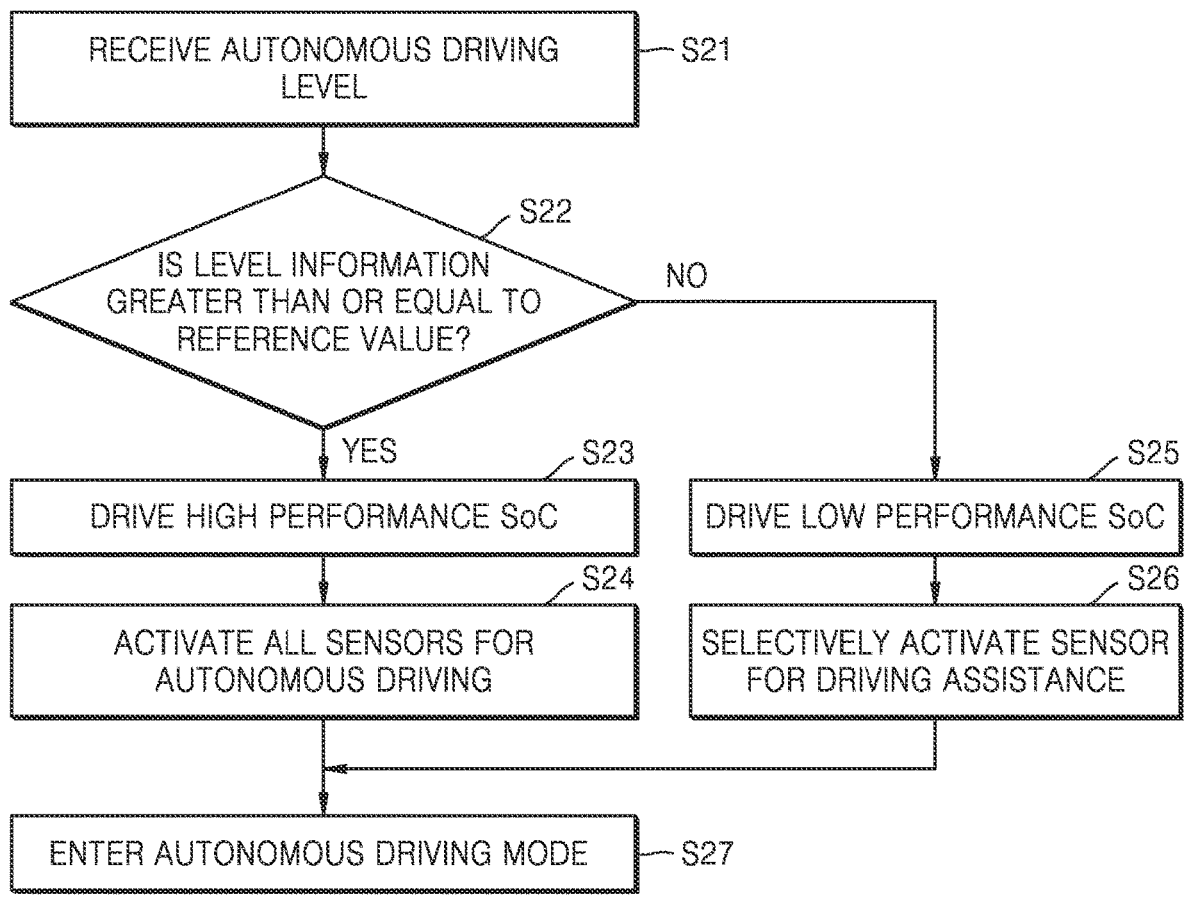
FIG. 6 is a flowchart illustrating an operating method of an autonomous driving system according to another embodiment.

FIG. 6 is a flowchart illustrating a method of operating an autonomous driving system according to another embodiment.

Referring to FIG. 6, the autonomous driving system may receive autonomous driving level information selected by a driver in operation S21, and may determine whether the autonomous driving level information is greater than or equal to a predetermined reference value in operation S22. The autonomous driving system may include a low performance SoC and a high performance SoC. When the autonomous driving level information is greater than or equal to a predetermined reference value, the high performance SoC may be selectively driven in operation S23. When the autonomous driving level information is less than a predetermined reference value, the low performance SoC may be selectively driven in operation S25.

Each of the low performance SoC and the high performance SoC may control activation operations for a plurality of sensors provided in a vehicle. For example, when the high performance SoC is driven, the high performance SoC may perform a control operation so that all sensors mounted in the vehicle are activated in operation S24. Alternatively, in other embodiments, the high performance SoC may activate different numbers of sensors according to the autonomous driving level, and a larger number of sensors may be activated as the autonomous driving level increases. Alternatively, when the low performance SoC is driven, the low performance SoC may perform a control operation for selectively activating driving assistance sensors among the sensors mounted in the vehicle so that a driving assistance operation according to the autonomous driving level may be performed in operation S26.

As driving of the SoC and activation of the sensors are completed, the SoC may enter the autonomous driving mode in operation S27, and may perform the autonomous driving operation through operation processing according to the above-described embodiments. Alternatively, according to the above-described embodiments, when a failure occurs in the currently driven SoC, the failure information Info_F may be provided to another SoC and the SoC receiving the failure information Info_F may execute the safe parking module to perform the safe parking function for the vehicle.

Figure 7:
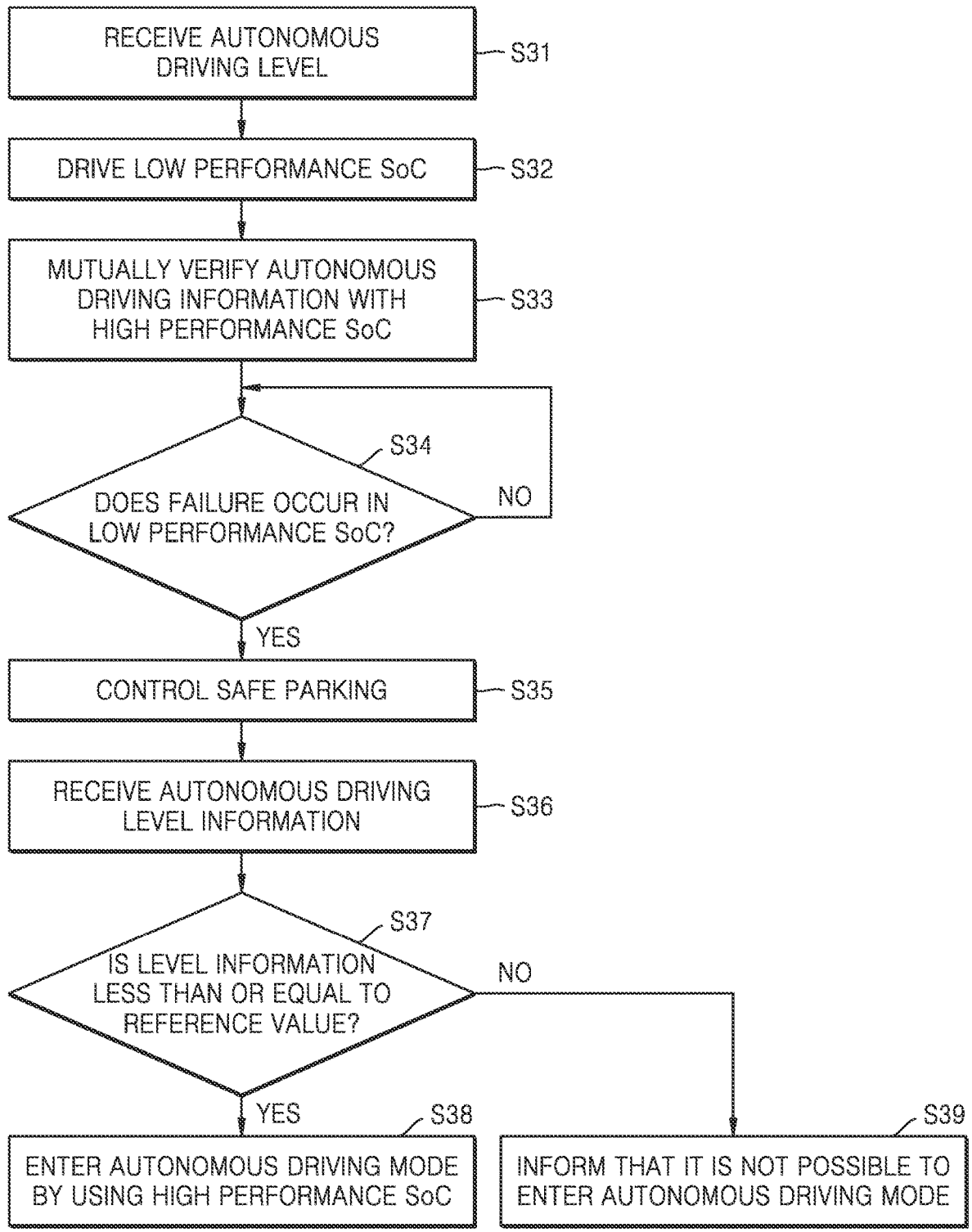
FIG. 7 is a flowchart illustrating an operating method of an autonomous driving system according to another embodiment.

FIG. 7 is a flowchart illustrating a method of operating an autonomous driving system according to another embodiment.

Referring to FIG. 7, the autonomous driving system may receive the level information representing the autonomous driving level in operation S31, and the low performance SoC may be driven based on the level information being less than a predetermined reference value in operation S32. The autonomous driving system may include the low performance SoC and the high performance SoC, and while the low performance SoC controls the autonomous driving function, the low performance SoC may provide various information items on the autonomous driving function including the sensor information to the high performance SoC. For example, in relation to various neural network operation processings related to the autonomous driving function, it is possible to improve the autonomous driving performance and to secure stability of the autonomous driving performance by mutually verifying accuracy of the processing result with the high performance SoC in operation S33.

Also, according to the above-described embodiments, the low performance SoC may determine whether a failure occurs in operation S34, and may provide the failure information to the high performance SoC when it is determined that a failure occurs in the low performance SoC. In addition, the high performance SoC may control a series of operations so that the vehicle may park or stop in a safe place by executing the safe parking module in response to the failure information.

In an embodiment, as a failure occurs in the low performance SoC, after the safe parking or stopping function is performed by the high performance SoC, the autonomous driving function may be performed by using the high performance SoC. For example, the high performance SoC may receive the autonomous driving level information selected by the driver, and may determine whether the autonomous driving level information is less than or equal to a predetermined reference value in operation S37. When it is determined that the autonomous driving level information selected by the driver is greater than a predetermined reference value, the autonomous driving system may output a message informing the driver that it is not possible to enter the autonomous driving mode in operation S39.

On the other hand, when it is determined that the autonomous driving level information is less than or equal to a predetermined reference value, the autonomous driving system may enter the autonomous driving mode by using the high performance SoC in operation S38. For example, when a failure occurs in the low performance SoC, mutual verification of various sensor information items processed by the high performance SoC may not be performed. Although a failure may occur in the high performance SoC, because the safe parking function may not be performed by another SoC, a control operation may be performed so that only the autonomous driving function less than or equal to a predetermined level may be selectively performed by the high performance SoC in the above case. In addition, according to the above-described embodiments, the high performance SoC may control a sensor activation operation according to the selected autonomous driving level.

Hereinafter, embodiments in which the autonomous driving system performs the autonomous driving function by using the storage will be described.

Figure 8:
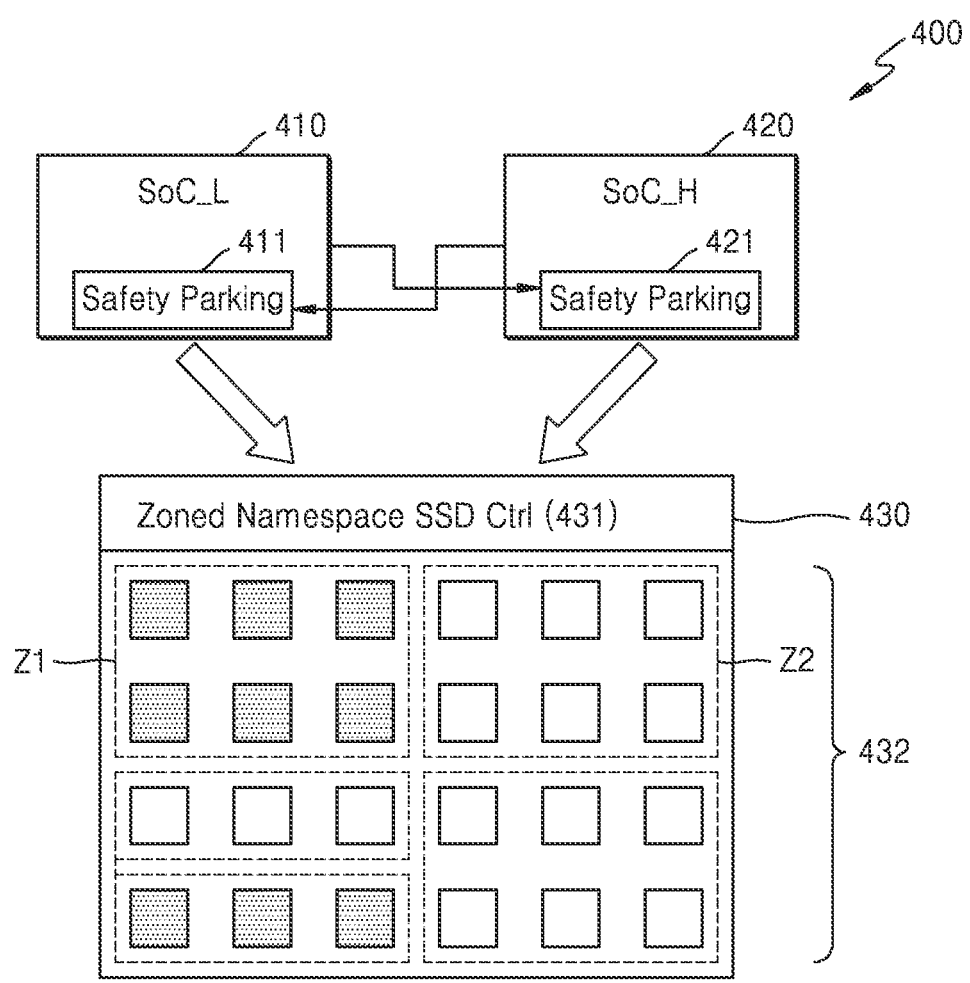
FIG. 8 is a block diagram illustrating an autonomous driving system according to another embodiment.

FIG. 8 is a block diagram illustrating an autonomous driving system 400 according to another embodiment.

Referring to FIG. 8, the autonomous driving system 400 may include at least two SoCs having different performances. For example, the autonomous driving system 400 may include a first SoC 410 and a second SoC 420, and the first SoC 410 may have lower performance than the second SoC 420. In addition, similar to as described with respect to the above-described embodiments, the first SoC 410 may include a first safe parking module 411, and the second SoC 420 may include a second safe parking module 421.

According to the embodiment, the autonomous driving system 400 may include a storage 430, and the storage 430 may include a solid state drive (SSD). In addition, as an example of the SSD, a zoned namespace SSD (ZNS SSD) is illustrated in FIG. 8. The storage 430 may include an SSD controller 431 and a memory device 432, the memory device 432 may include a plurality of namespaces, and the plurality of namespaces may be classified into at least two zones. For example, each of a first zone Z1 and a second zone Z2 may include one or more namespaces, and each of the namespaces may include one or more flash cell blocks. In addition, each block of the memory device 432 illustrated in FIG. 8 may correspond to a namespace or a flash cell block.

In an embodiment, the first SoC 410 and the second SoC 420 may share the storage 430, the first zone Z1 of the storage 430 may be allocated to the first SoC 410, and the second zone Z2 of the storage 430 may be allocated to the second SoC 420. Accordingly, in the storage 430, information items on different autonomous driving levels may be stored in different zones. For example, the first SoC 410 may sequentially store information on autonomous driving for namespaces allocated to the first zone Z1 of the storage 430. In addition, the second SoC 420 may sequentially store information on autonomous driving for namespaces allocated to the second zone Z2 of the storage 430.

In addition, a data deletion unit in the storage 430 may be set in various ways, and a deletion operation may be performed on each zone in the storage 430 in units of zones. In an embodiment, the first zone Z1 allocated to the first SoC 410 and the second zone Z2 allocated to the second SoC 420 may have the same deletion cycle or different deletion cycles.

According to the above-described configuration, by processing only information stored in a specific area of the storage 430 in a specific situation such as an accident, because it is possible to easily identify a cause of the accident and a subject of the accident, and to reduce a background operation such as a garbage collection, which may be frequently performed in a random write method, it is possible to increase an access speed of writing/reading of related information in the autonomous driving function.

Figure 9A:
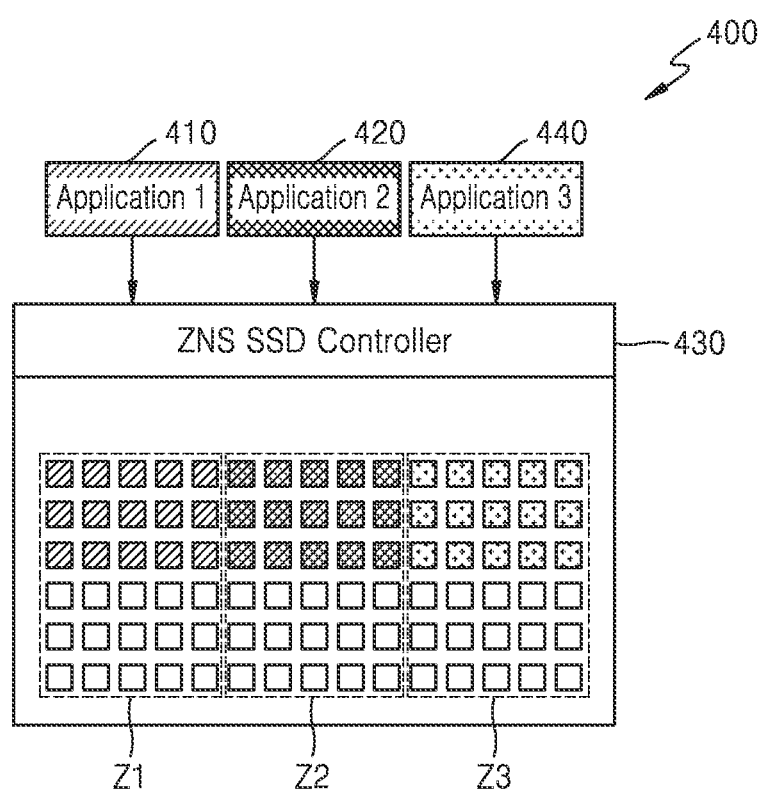
FIG. 9A is a first block diagram illustrating a usage example of a storage in an autonomous driving system according to an embodiment.
Figure 9B:
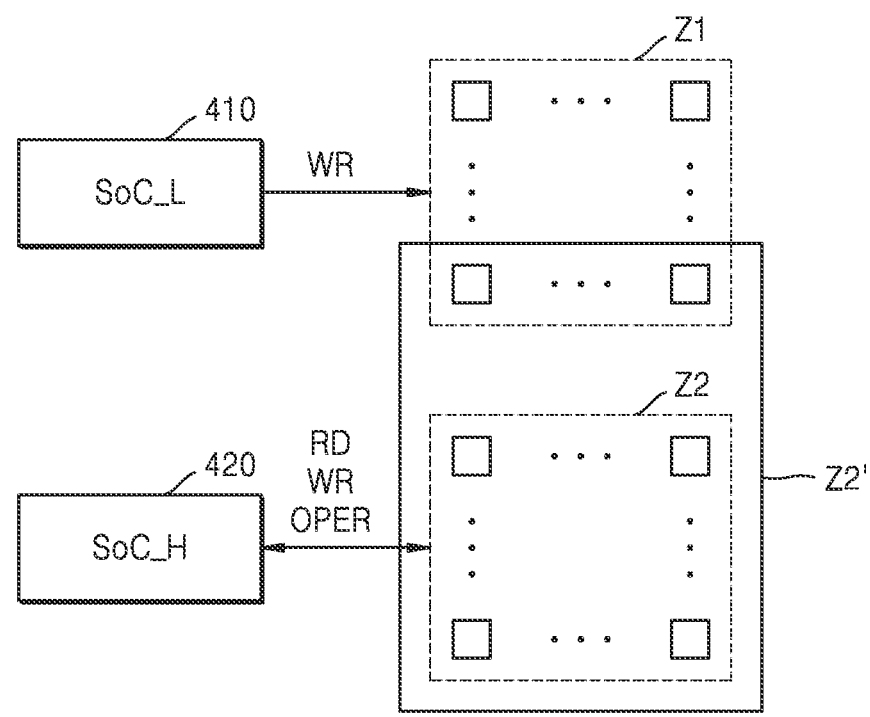
FIG. 9B is a second block diagram illustrating a usage example of a storage in an autonomous driving system according to an embodiment.

FIGS. 9A and 9B are block diagrams illustrating a usage example of the storage 430 in the autonomous driving system 400 according to an embodiment.

Referring to FIG. 8 and FIG. 9A, access to the storage 430 may be performed by first to third applications, and a first zone Z1, a second zone Z2, and a third zone Z3 provided in the storage 430 may be allocated to the first to third applications. According to the above-described embodiment, the autonomous driving system 400 may include the first SoC 410 and the second SoC 420, and the first application may be provided in the first SoC 410 to perform a function related to autonomous driving and may access the first zone Z1 of the storage 430. In addition, the second application may be provided in the second SoC 420 to perform a function related to autonomous driving and may access the second zone Z2 of the storage 430.

In addition, the third application 440 additionally illustrated in FIG. 9A may be another application provided in the first SoC 410 or the second SoC 420 and may access the third zone Z3 of the storage 430 in relation to the autonomous driving function or a function unrelated thereto. Alternatively, the autonomous driving system 400 may further include an additional SoC, and the third application 440 may be provided in the additional SoC to perform the autonomous driving function.

Referring to FIG. 9B, the first SoC 410 may access the namespaces of the first zone Z1, and the second SoC 420 may access the namespaces of the second zone Z2. When the first SoC 410 operating at low performance is driven as the driver selects the autonomous driving level, the first SoC 410 may perform only a function related to driving assistance in relation to autonomous driving, and when accessing the first zone Z1, a storage space of the first zone Z1 may be used for storing information on autonomous driving in the first zone Z1 WR.

On the other hand, when the second SoC 420 operating at high performance is driven, the second SoC 420 may perform neural network operation by using sensor information items provided by a plurality of sensors so that a large storage space may be required to perform the autonomous driving function. When accessing the second zone Z2, the second SoC 420 may store input information used for the neural network operation, weight information during an operation processing process, and an operation intermediate result in the second zone Z2, or may perform the neural network operation by using information read from the second zone Z2. Accordingly, the second SoC 420 may use a storage space of the second zone Z2 for reading and storing various types of data items RD and WR. In addition, when the storage 430 may perform an operation function, the second SoC 420 may provide an instruction OPER for instructing an operation to the storage 430.

In an embodiment, when a failure occurs in the first SoC 410 while the first SoC 410 is driven, according to the above-described embodiments, the second SoC 420 may execute the safe parking module and the first SoC 410 may not perform an operation related to the autonomous driving function. In an embodiment, when a failure occurs in the first SoC 410, a size of the storage space of the storage 430 allocated to the first SoC 410 may be reduced, and a partial storage space allocated to the first SoC 410 may be allocated to the second SoC 420. In the example of FIG. 9B, it is illustrated that additional namespaces are allocated to a changed second zone Z2' allocated to the second SoC 420.

Figure 10:
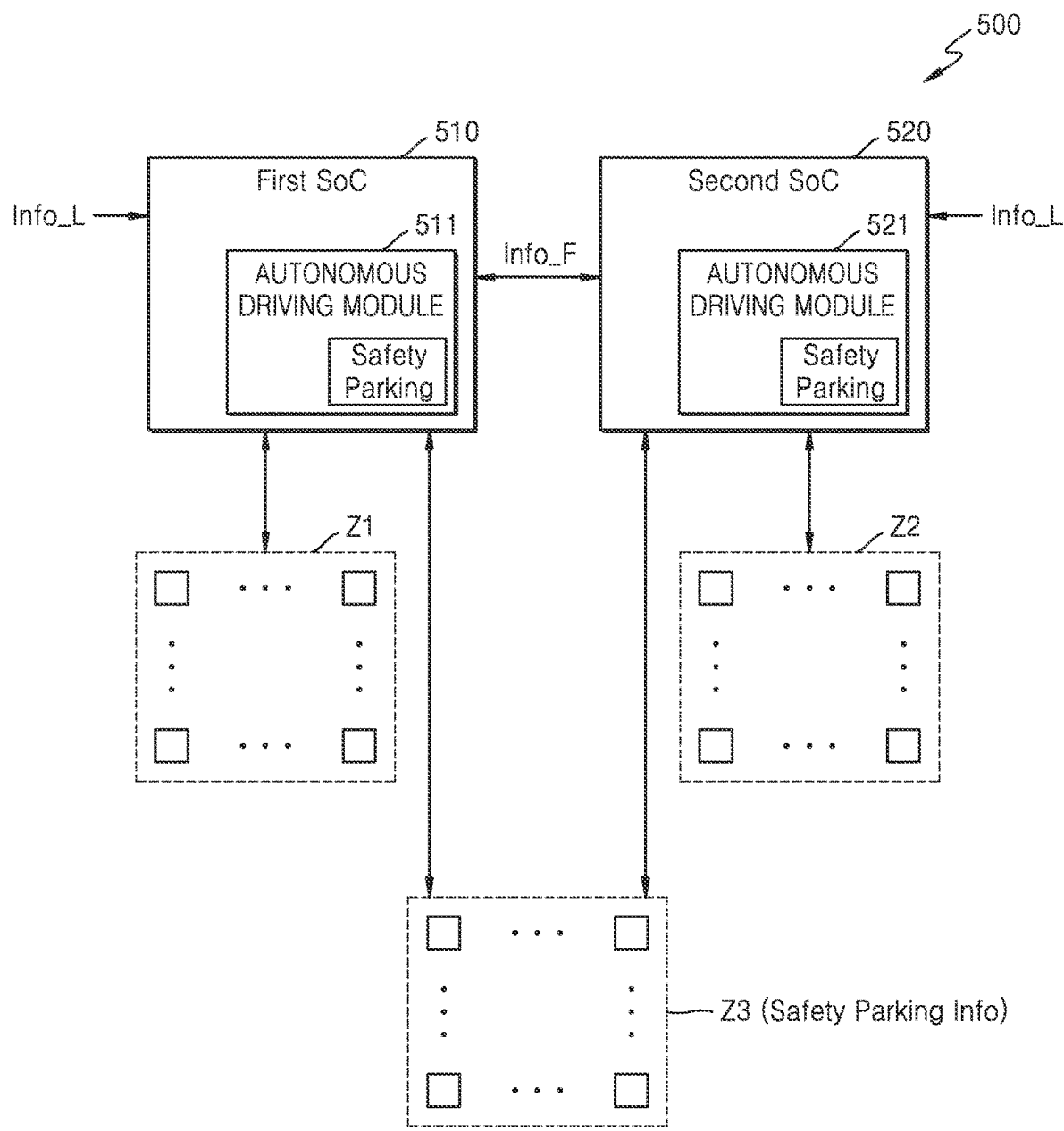
FIG. 10 is a block diagram illustrating an autonomous driving system according to another embodiment.

FIG. 10 is a block diagram illustrating an autonomous driving system 500 according to another embodiment.

Referring to FIG. 10, the autonomous driving system 500 may include a first SoC 510, a second SoC 520, and storage, and the storage may include, for example, a first zone Z1, a second zone Z2, and a third zone Z3. Each of the first SoC 510 and the second SoC 520 may be selectively driven according to the level information Info_L, the first SoC 510 may include a first autonomous driving module 511, and the second SoC 520 may include a second autonomous driving module 521. In addition, each of the first autonomous driving module 511 and the second autonomous driving module 521 may include a safe parking module. In addition, when a failure occurs in an SoC, the failure information Info_F may be transmitted and received between the first SoC 510 and the second SoC 520.

In an embodiment, the first zone Z1 may be allocated to the first SoC 510, and the second zone Z2 may be allocated to the second SoC 520. In addition, the third zone Z3 may be allocated to the first SoC 510 and the second SoC 520. When the first SoC 510 performs the autonomous driving function, the first SoC 510 may store various information items on autonomous driving in the first zone Z1. In addition, when the second SoC 520 performs the autonomous driving function, the second SoC 520 may store various information items on autonomous driving in the second zone Z2. In addition, the third zone Z3 may store information items on safe parking, and when the failure information Info_F is provided from the second SoC 520 to the first SoC 510, the first SoC 510 may store various information items on safe parking in the third zone Z3. In addition, when the failure information Info_F is provided from the first SoC 510 to the second SoC 520, the second SoC 520 may store various information items on safe parking in the third zone Z3.

Figure 11:
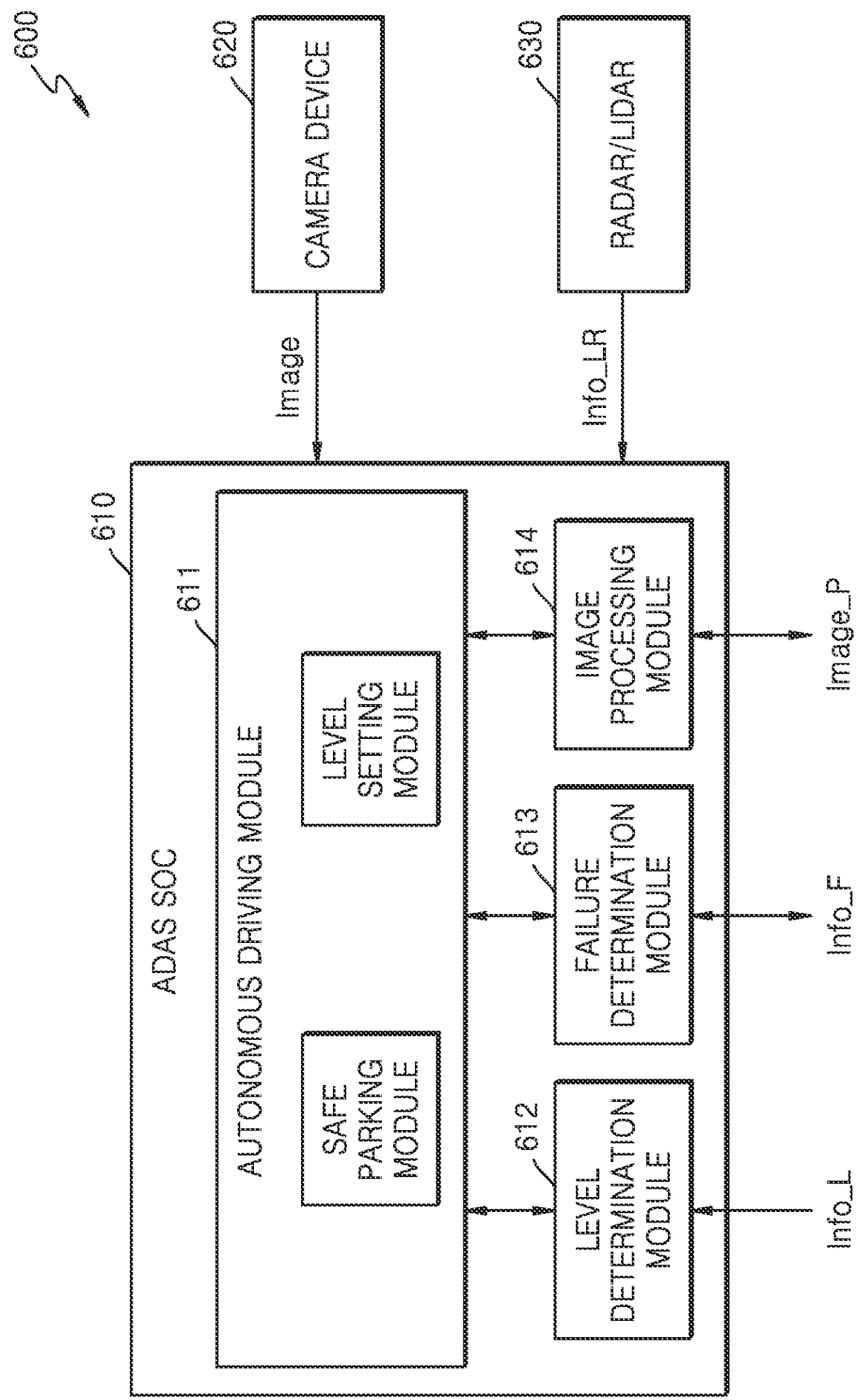
FIG. 11 is a block diagram illustrating an autonomous driving system including an advanced driver assistance system (ADAS) SoC according to a modifiable embodiment.

FIG. 11 is a block diagram illustrating an autonomous driving system 600 including an advanced driver assistance system (ADAS) SoC 610 according to a modifiable embodiment.

Referring to FIG. 11, the autonomous driving system 600 may include the ADAS SoC 610, at least one camera device 620, and at least one radar/LIDAR 630. Various sensors in the above-described embodiments may include the camera device 620 and the radar/LIDAR 630, and various types of sensors used for autonomous driving may be provided in the autonomous driving system 600.

The ADAS SoC 610 may include an autonomous driving module 611, a level determination module 612, a failure determination module 613, and an image processing module 614. In addition, the autonomous driving module 611 may include a safe parking module and a level setting module. According to embodiments, at least some of the various modules described above may be implemented as software, and the ADAS SoC 610 may include one or more processors for executing the software.

The level determination module 612 may determine whether the ADAS SoC 610 performs the autonomous driving function based on the level information Info_L on the autonomous driving level. The autonomous driving module 611 may set the autonomous driving level based on the determination result of the level determination module 612, and may control the autonomous driving function according to the set autonomous driving level.

In addition, the failure determination module 613 may determine whether a failure occurs in the ADAS SoC 610, may output or receive the failure information Info_F to or from the outside, and may process the received failure information Info_F. According to the above-described embodiments, it may be determined whether a failure occurs in the ADAS SoC 610 based on various criteria such as a process of processing sensor information items and encryption/decryption processes related to security, and when the failure determination module 613 outputs the failure information Info_F to the outside, an internal operation of the ADAS SoC 610 may be controlled so that the autonomous driving module 611 is not driven. In addition, when the failure determination module 613 receives the failure information Info_F from the outside, the internal operation of the ADAS SoC 610 may be controlled so that the safe parking module is driven.

The at least one camera device 620 may provide a captured image as image information Image to the ADAS SoC 610, and the radar/LIDAR 630 may provide radar/LIDAR information Info_LR as sensing information on a measured distance. The image processing module 614 may process the image information Image from the camera device 620 and may provide the processed image Image_P to the outside. In addition, the image processing module 614 may detect/recognize an object included in the image information Image through a neural network operation according to the above-described embodiments and may provide the detection/recognition result to the autonomous driving module 611. The autonomous driving module 611 may control autonomous driving of the vehicle based on the detection/recognition result.

While non-limiting example embodiments have been particularly shown and described in the present disclosure, it will be understood that various changes in form and details may be made therein without departing from the spirit and scope of the present disclosure.

What is claimed is:

1. An autonomous driving system comprising:
a first system on chip (SoC) configured to control an autonomous driving function of a vehicle and comprising a first safe parking module configured to control parking of the vehicle according to first failure information provided from an outside of the first SoC;
a second SoC configured to be driven at a higher operating performance than an operating performance of the first SoC, configured to control the autonomous driving function of the vehicle, and comprising a second safe parking module configured to control the parking of the vehicle according to second failure information provided from an outside of the second SoC; and
a storage comprising a storage space for the first SoC and the second SoC,
wherein the first SoC or the second SoC is configured to be selectively driven according to level information corresponding to an autonomous driving level, and
wherein, while the first SoC is selected to control the autonomous driving function, the second safe parking module is further configured to control the parking or stopping of the vehicle in response to receiving the second failure information from the first SoC.

2. The autonomous driving system of claim 1, wherein each of the first SoC and the second SoC comprises a driving setter, and each of the first SOC and the second SoC is configured to receive the level information,
wherein the driving setter of the first SoC is configured to be selectively driven based on the level information being less than a reference level, and
wherein the driving setter of the second SoC is configured to be selectively driven based on the level information being greater than the reference level.

3. The autonomous driving system of claim 1, further comprising a driving controller configured to receive the level information and selectively drive one from among the first SoC and the second SoC according to a result of comparing the level information with a reference level.

4. The autonomous driving system of claim 1, wherein the first SoC is configured to be selectively driven based on the level information corresponding to a first level at which a driver is responsible for a vehicle accident, and
wherein the second SoC is configured to be selectively driven based on the level information corresponding to a second level at which the autonomous driving system is responsible for the vehicle accident.

5. The autonomous driving system of claim 1, wherein the storage comprises a zoned namespace solid state drive (SSD) (ZNS SSD) comprising a plurality of zones, and each of the plurality of zones comprises one or more namespaces, and
wherein a first zone among the plurality of zones is allocated to the first SoC and a second zone different from the first zone is allocated to the second SoC.

6. The autonomous driving system of claim 5, wherein the first SoC sequentially stores information on the autonomous driving function in the first zone, and
wherein the second SoC sequentially stores information on the autonomous driving function in the second zone.

7. The autonomous driving system of claim 5, wherein, based on a failure occurring in the first SoC while the first SoC is selected to control the autonomous driving function, the storage is configured to allocate at least one namespace included in the first zone to the second zone.

8. The autonomous driving system of claim 1, wherein, based on a failure occurring in the second SoC while the second SoC is selected to control the autonomous driving function, the first safe parking module is further configured to control the parking of the vehicle in response to receiving the first failure information from the second SoC.

9. The autonomous driving system of claim 1, wherein the first failure information and the second failure information are transmitted between the first SoC and the second SoC.

10. An operating method of an autonomous driving system configured to control an autonomous driving function of a vehicle that includes a plurality of sensors, the operating method comprising:
receiving level information corresponding to an autonomous driving level;
selectively driving a first system on chip (SoC) provided in the autonomous driving system based on the level information being less than a reference level;
controlling autonomous driving of the vehicle based on control of the first SoC; and
controlling parking or stopping of the vehicle, based on control of a second SoC provided in the autonomous driving system, based on a determination that a failure occurs in the first SoC while the first SoC is driven,
wherein the second SoC has a higher operating performance than an operating performance of the first SoC.

11. The operating method of claim 10, further comprising:
selectively driving the second SoC based on the level information being greater than the reference level; and
controlling parking of the vehicle, based on control of the first SoC, based on a determination that a failure occurs in the second SoC while the second SoC is driven.

12. The operating method of claim 11, wherein a number of the plurality of sensors activated when the second SoC is selectively driven is greater than a number of the plurality sensors activated when the first SoC is selectively driven.

13. The operating method of claim 10, wherein the operating method further comprises determining whether to drive the first SoC or the second SoC based on a result of comparing the level information with the reference level.

14. The operating method of claim 10, further comprising accessing a zoned namespace solid state drive (SSD) (ZNS SSD) provided in the autonomous driving system by at least one from among the first SoC and the second SoC,
wherein the ZNS SSD includes a plurality of zones, each of the plurality of zones including one or more namespaces, and different zones are allocated to the first SoC and the second SoC.

15. The operating method of claim 14, further comprising:
sequentially storing, by the first SoC, information on the autonomous driving function in a first zone from among the plurality of zones, and
sequentially storing, by the second SoC, information on the autonomous driving function in a second zone from among the plurality of zones.

16. The operating method of claim 10, further comprising:
transmitting, between the first SoC and the second SoC, failure information representing that the failure occurs in the first SoC.

17. A system on chip (SoC) comprising:
at least one processor; and
memory storing at least one computer program that, when executed by the at least one processor, is configured to:
selectively drive an autonomous driving module, that controls an autonomous driving function of a vehicle, based on a comparison between level information and a predetermined reference level, wherein the level information is received by the SoC and corresponds to an autonomous driving level selected among a plurality of autonomous driving levels; and
control parking or stopping of the vehicle by driving the autonomous driving module in response to first failure information indicating a first failure that occurs in an external SoC in a state in which the autonomous driving module is not driven.

18. The SoC of claim 17, wherein the at least one computer program, when executed by the at least one processor, is configured to:
selectively drive the autonomous driving module based on the level information being less than the predetermined reference level; and
provide second failure information to the external SoC based on determining that a second failure occurs while the autonomous driving module is driven,
wherein the external SoC has a higher operating performance than an operating performance of the SoC.

19. The SoC of claim 17, wherein the at least one computer program, when executed by the at least one processor, is configured to:
selectively drive the autonomous driving module based on the level information being greater than the predetermined reference level; and
provide second failure information to the external SoC based on determining that a second failure occurs while the autonomous driving module is driven,
wherein the external SoC has a lower operating performance than an operating performance of the SoC.

20. The SoC of claim 17, wherein the at least one computer program, when executed by the at least one processor, is configured to access zoned namespace solid state drive (SSD) (ZNS SSD), and
wherein the ZNS SSD comprises a first zone that is allocated to the SoC, and further comprises a second zone that is allocated to the external SoC, and information items on autonomous driving are sequentially stored in the first zone and the second zone.

* * * * *